US012778210B2

(12) United States Patent
Lim et al.

(10) Patent No.: US 12,778,210 B2
(45) Date of Patent: Nov. 3, 2026

(54) AEROSOL GENERATING DEVICE WHICH ACCURATELY SENSES HEATER TEMPERATURE

(71) Applicant: KT&G CORPORATION, Daejeon (KR)

(72) Inventors: Hunil Lim, Seoul (KR); Taehun Kim, Yongin-si (KR)

(73) Assignee: KT&G CORPORATION, Daejeon (KR)

( * ) Notice: Subject to any disclaimer, the term of this patent is extended or adjusted under 35 U.S.C. 154(b) by 419 days.

(21) Appl. No.: 18/017,020

(22) PCT Filed: Mar. 2, 2022

(86) PCT No.: PCT/KR2022/002902
§ 371 (c)(1),
(2) Date: Jan. 19, 2023

(87) PCT Pub. No.: WO2022/186583
PCT Pub. Date: Sep. 9, 2022

(65) Prior Publication Data

US 2023/0270177 A1 Aug. 31, 2023

(30) Foreign Application Priority Data

Mar. 2, 2021 (KR) ........................ 10-2021-0027582

(51) Int. Cl.
*A24F 40/10* (2020.01)
*A24F 40/20* (2020.01)
(Continued)

(52) U.S. Cl.
CPC .............. *A24F 40/57* (2020.01); *A24F 40/10* (2020.01); *A24F 40/20* (2020.01); *A24F 40/30* (2020.01);
(Continued)

(58) Field of Classification Search
CPC .......... A24F 40/00; A24F 40/10; A24F 40/20; A24F 40/30; A24F 40/40; A24F 40/42;
(Continued)

(56) References Cited

U.S. PATENT DOCUMENTS

2016/0192710 A1* 7/2016 Liu ......................... A24F 40/44 131/329
2017/0280779 A1* 10/2017 Qiu .................... G05D 23/1919
(Continued)

FOREIGN PATENT DOCUMENTS

CA 3077663 5/2019
CA 3130556 A1 9/2020
(Continued)

OTHER PUBLICATIONS

PCT International Application No. PCT/KR2022/002902, International Search Report dated Jun. 30, 2022, 2 pages.
(Continued)

*Primary Examiner* — Michael H. Wilson
*Assistant Examiner* — Michael Patrick Mullen
(74) *Attorney, Agent, or Firm* — Foley & Lardner LLP

(57) ABSTRACT

An aerosol-generating device is disclosed. The aerosol-generating device of the present disclosure includes a cartridge, which includes a chamber configure to store a liquid, a wick for receiving the liquid from the chamber, and a heater for heating the wick, a case, to which the cartridge is detachably coupled and which has an insertion space formed to accommodate insertion of a stick therein, a first circuit including the heater, and a second circuit for sensing the temperature of the heater. The second circuit includes a first resistor, which is disposed to be in contact with or adjacent to the heater to receive heat from the heater, wherein a resistance value of the first resistor is variable based on changes in the temperature thereof, a second resistor con-
(Continued)

B-B' nected to the first resistor, and a sensor for acquiring the value of current applied to the second resistor.

13 Claims, 12 Drawing Sheets

(51) Int. Cl.

| | |
|---|---|
| ***A24F 40/30*** | (2020.01) |
| ***A24F 40/40*** | (2020.01) |
| ***A24F 40/42*** | (2020.01) |
| ***A24F 40/44*** | (2020.01) |
| ***A24F 40/46*** | (2020.01) |
| ***A24F 40/485*** | (2020.01) |
| ***A24F 40/50*** | (2020.01) |
| ***A24F 40/51*** | (2020.01) |
| ***A24F 40/57*** | (2020.01) |
| ***G01K 7/16*** | (2006.01) |
| ***H05B 1/02*** | (2006.01) |
| ***H05B 3/00*** | (2006.01) |
| ***H05B 3/42*** | (2006.01) |
| *A24F 40/60* | (2020.01) |

(52) U.S. Cl.
CPC .............. *A24F 40/40* (2020.01); *A24F 40/42* (2020.01); *A24F 40/44* (2020.01); *A24F 40/46* (2020.01); *A24F 40/485* (2020.01); *A24F 40/50* (2020.01); *A24F 40/51* (2020.01); *G01K 7/16* (2013.01); *H05B 1/0202* (2013.01); *H05B 1/0227* (2013.01); *H05B 3/0019* (2013.01); *H05B 3/42* (2013.01); *A24F 40/60* (2020.01)

(58) Field of Classification Search
CPC ........ A24F 40/44; A24F 40/46; A24F 40/465; A24F 40/50; A24F 40/51; A24F 40/53; A24F 40/57
See application file for complete search history.

(56) References Cited

U.S. PATENT DOCUMENTS

| | | | | |
|---|---|---|---|---|
| 2017/0325510 | A1 | 11/2017 | Hu et al. | |
| 2020/0154766 | A1* | 5/2020 | Jeong | A24F 40/30 |
| 2020/0214355 | A1 | 7/2020 | Lee et al. | |
| 2020/0237013 | A1 | 7/2020 | Yamada et al. | |
| 2020/0345066 | A1 | 11/2020 | Kim et al. | |
| 2020/0375251 | A1 | 12/2020 | Borges et al. | |
| 2020/0390156 | A1 | 12/2020 | An et al. | |
| 2021/0307406 | A1* | 10/2021 | Marubashi | G05B 15/02 |
| 2025/0268309 | A1* | 8/2025 | Xiao | G01K 7/245 |

FOREIGN PATENT DOCUMENTS

| | | | | |
|---|---|---|---|---|
| CN | 104571192 A | | 4/2015 | |
| CN | 208523778 U | | 2/2019 | |
| CN | 111491528 A | | 8/2020 | |
| JP | 2018-505696 | | 3/2018 | |
| JP | 2020-527344 | | 9/2020 | |
| JP | 6785391 B1 | * | 11/2020 | A24F 40/53 |
| JP | 2013-073758 | | 4/2023 | |
| KR | 1020200044911 | | 4/2020 | |
| KR | 1020200057490 | | 5/2020 | |
| KR | 1020200098679 A | | 8/2020 | |
| KR | 10-2020-0124664 | | 11/2020 | |
| RU | 2738703 | | 12/2020 | |
| RU | 2741921 | | 1/2021 | |
| WO | 2019239548 | | 12/2019 | |
| WO | 2020-180126 | | 9/2020 | |

OTHER PUBLICATIONS

Korean Intellectual Property Office Application No. 10-2021-0027582, Notice of Allowance dated Aug. 15, 2023, 2 pages.
Russian Federation Federal Service for Intellectual Property, Patents and Trademarks Application Serial No. 2023102975/03, Office Action dated Jul. 26, 2023, 7 pages.
Korean Intellectual Property Office Application No. 10-2021-0027582, Office Action dated Feb. 22, 2023, 3 pages.
Japan Patent Office Application No. 2023-513469, Office Action dated Mar. 5, 2024, 2 pages.
European Search Report dated Mar. 20, 2025, on European Patent Appl. No. 22763565.3.
Chinese Office Action dated Nov. 12, 2025, on Chinese Patent Appl. No. 202280005790.5.

* cited by examiner

【FIG. 1】
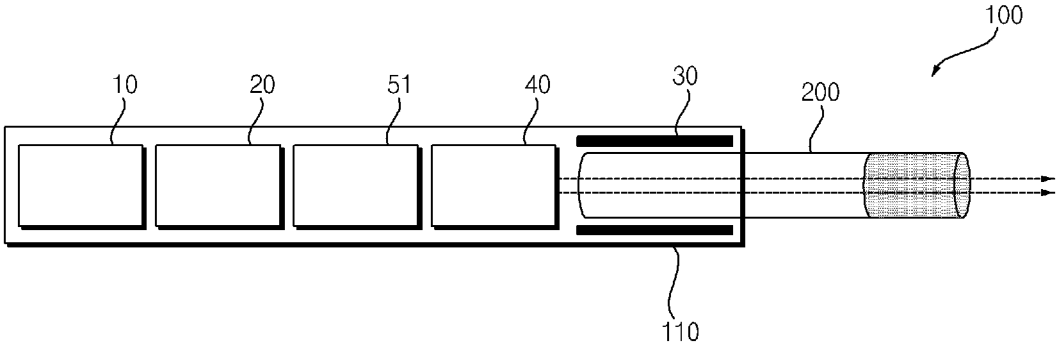

【FIG. 2】
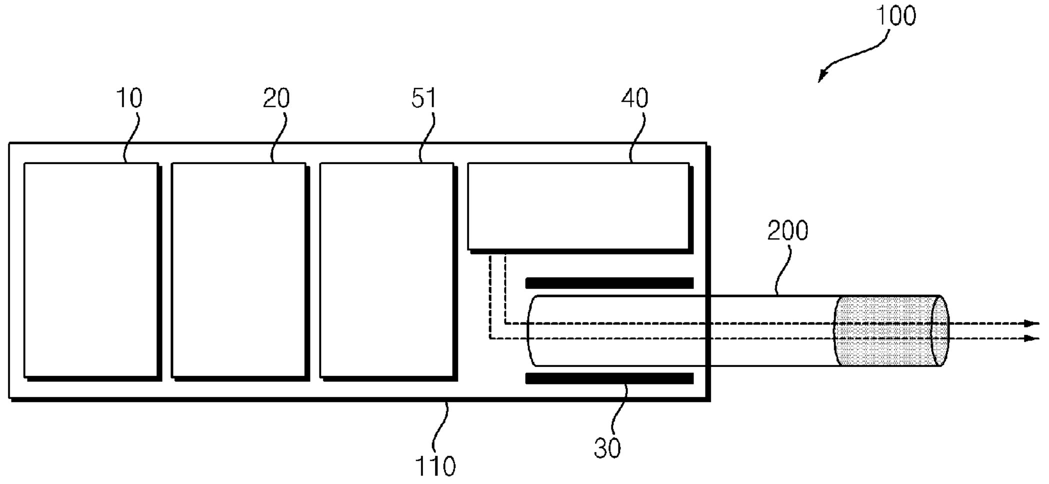

【FIG. 3】
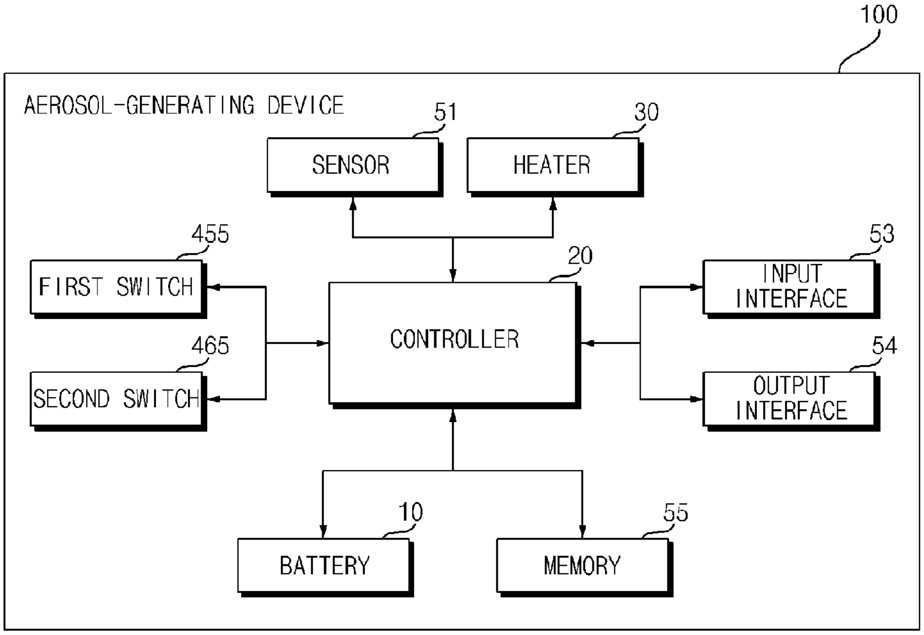

【FIG. 4】
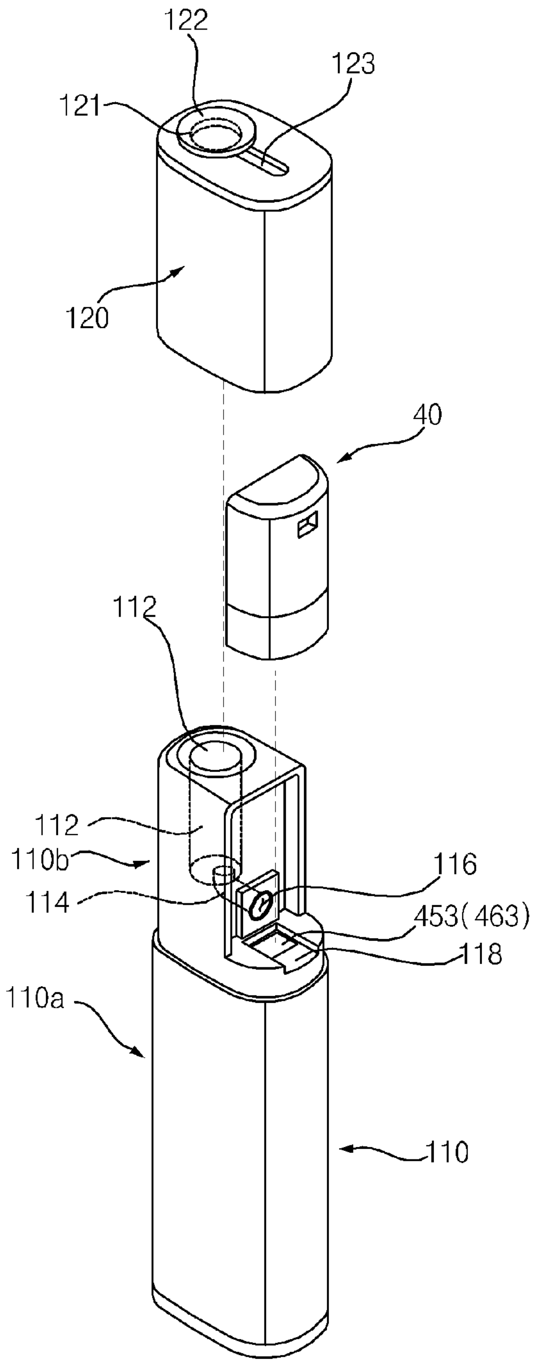

【FIG. 5】
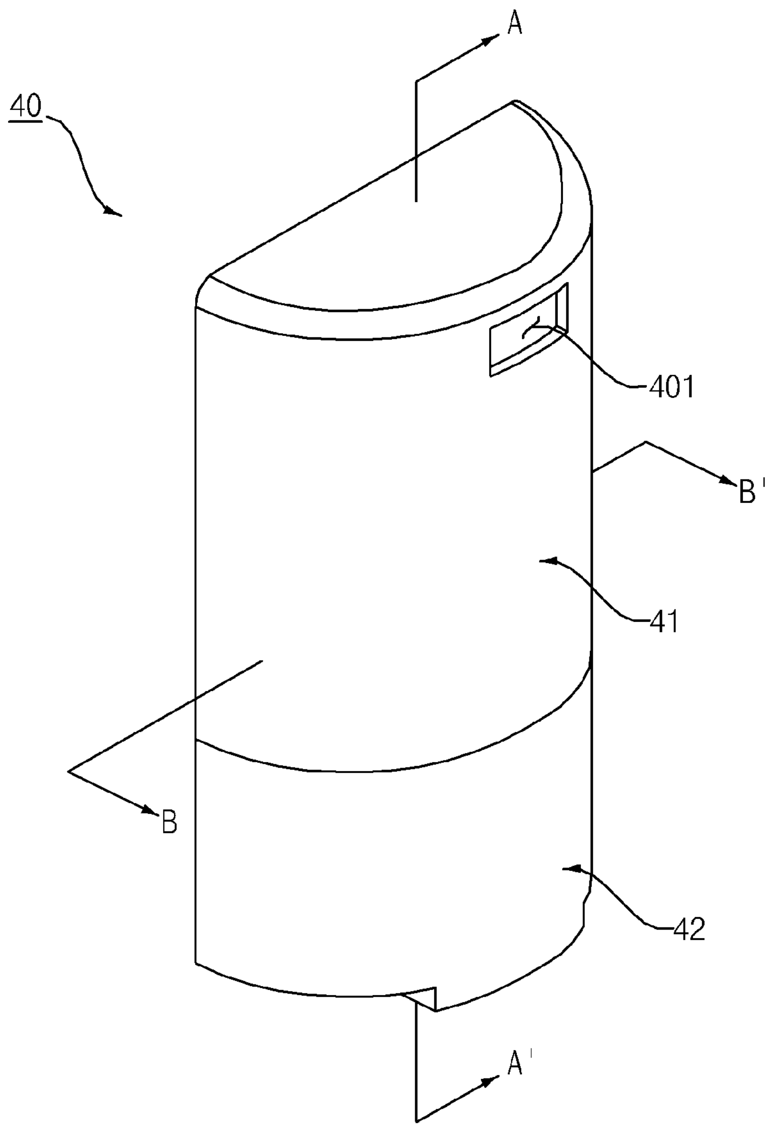

【FIG. 6】
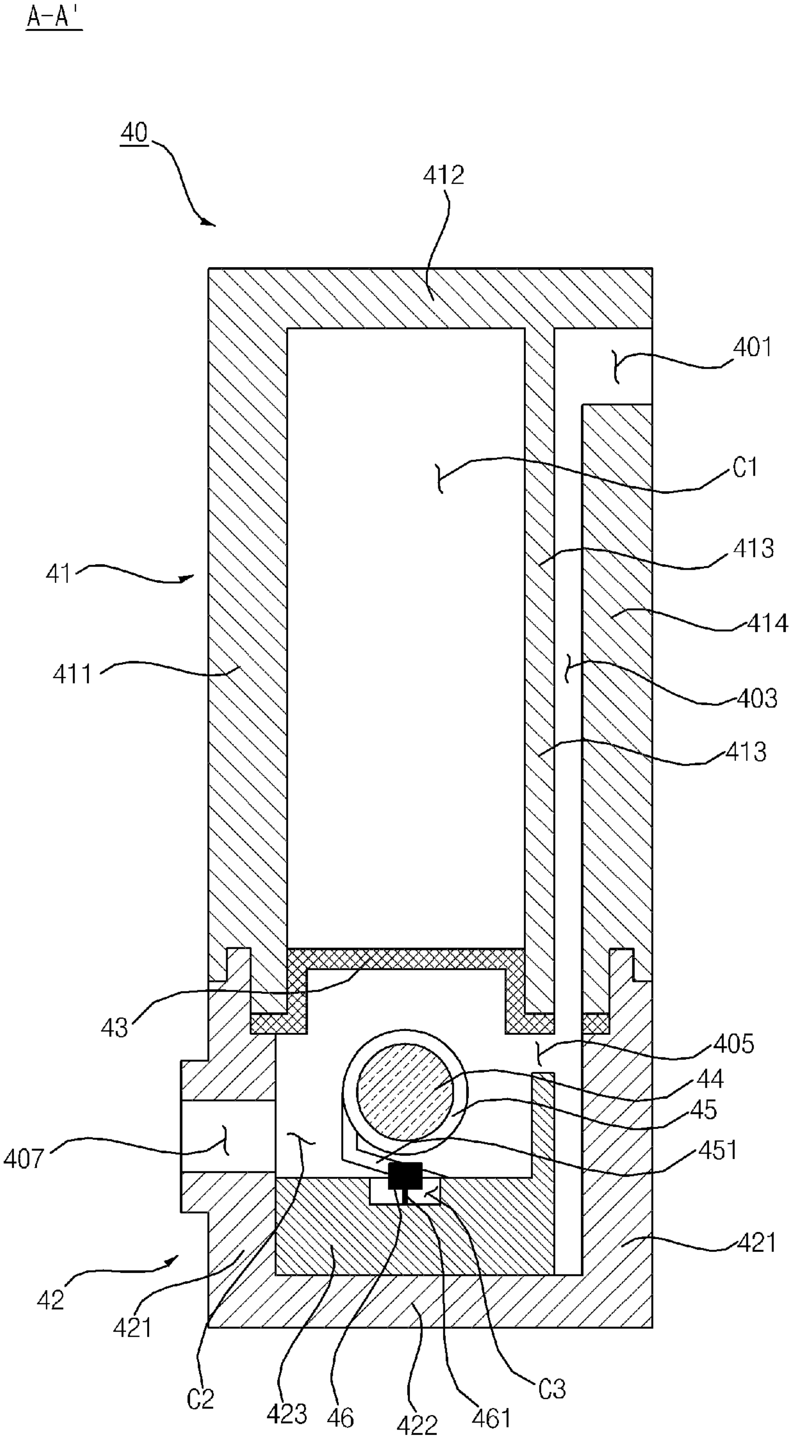

【FIG. 7】
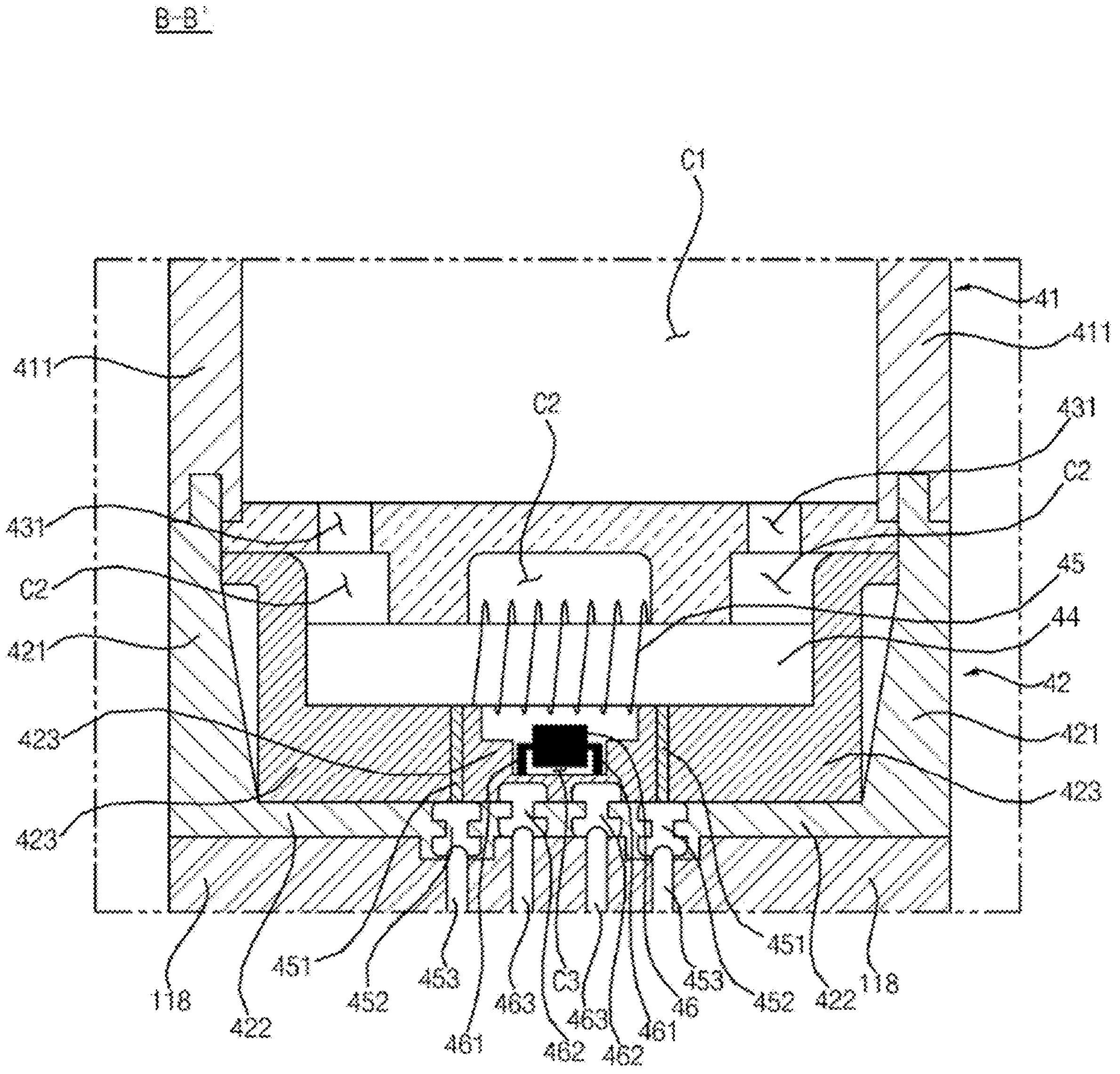

【FIG. 8】
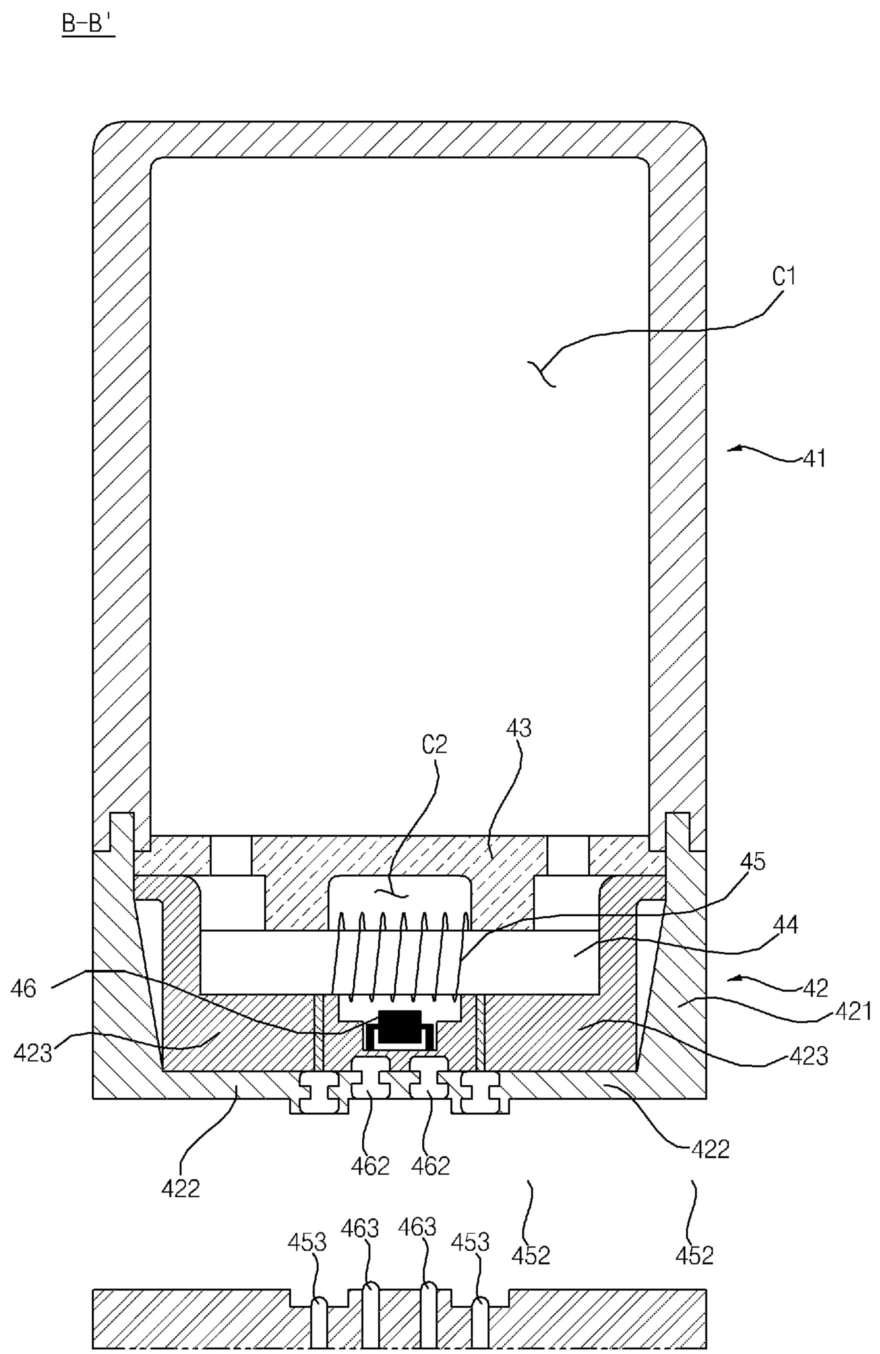

【FIG. 9】
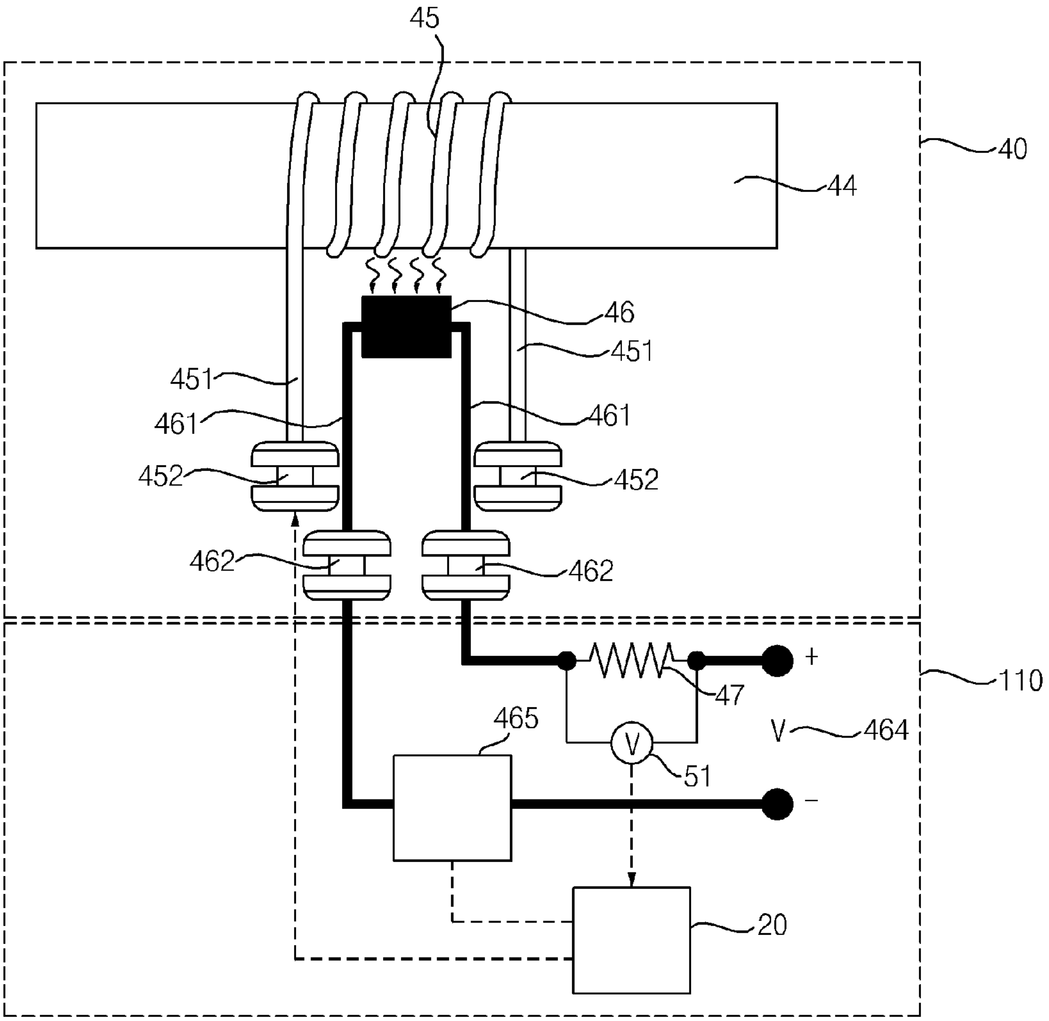

【FIG. 10】
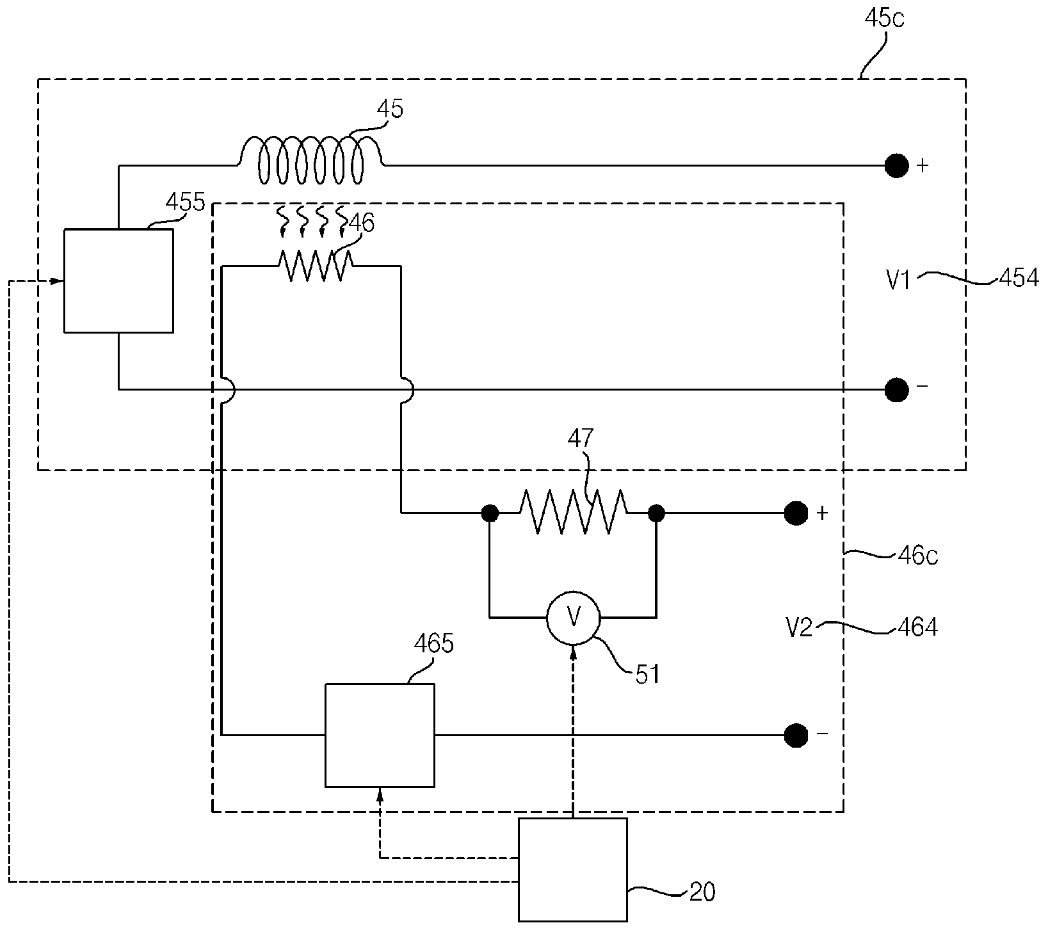

【FIG. 11】
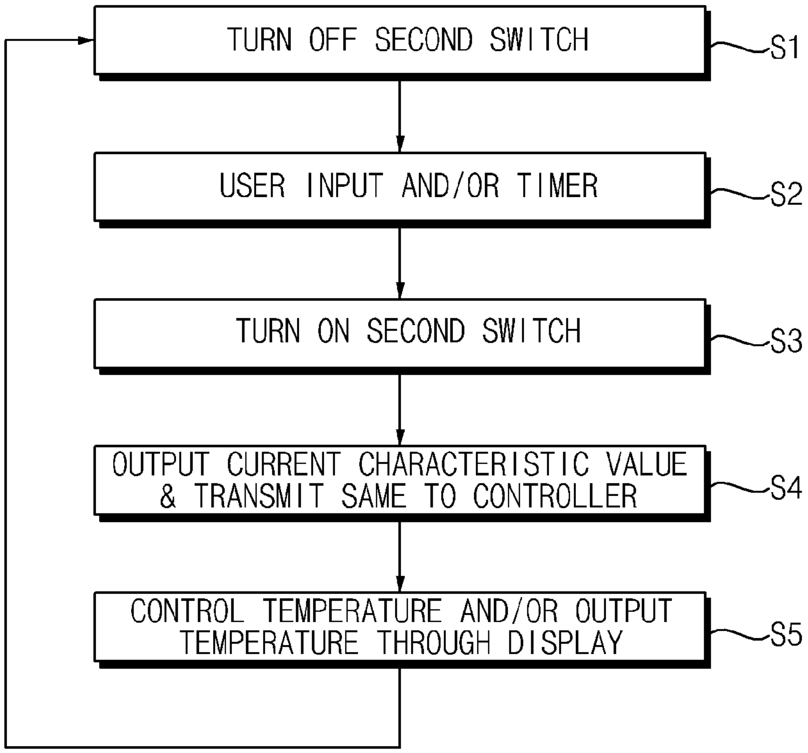

【FIG. 12】
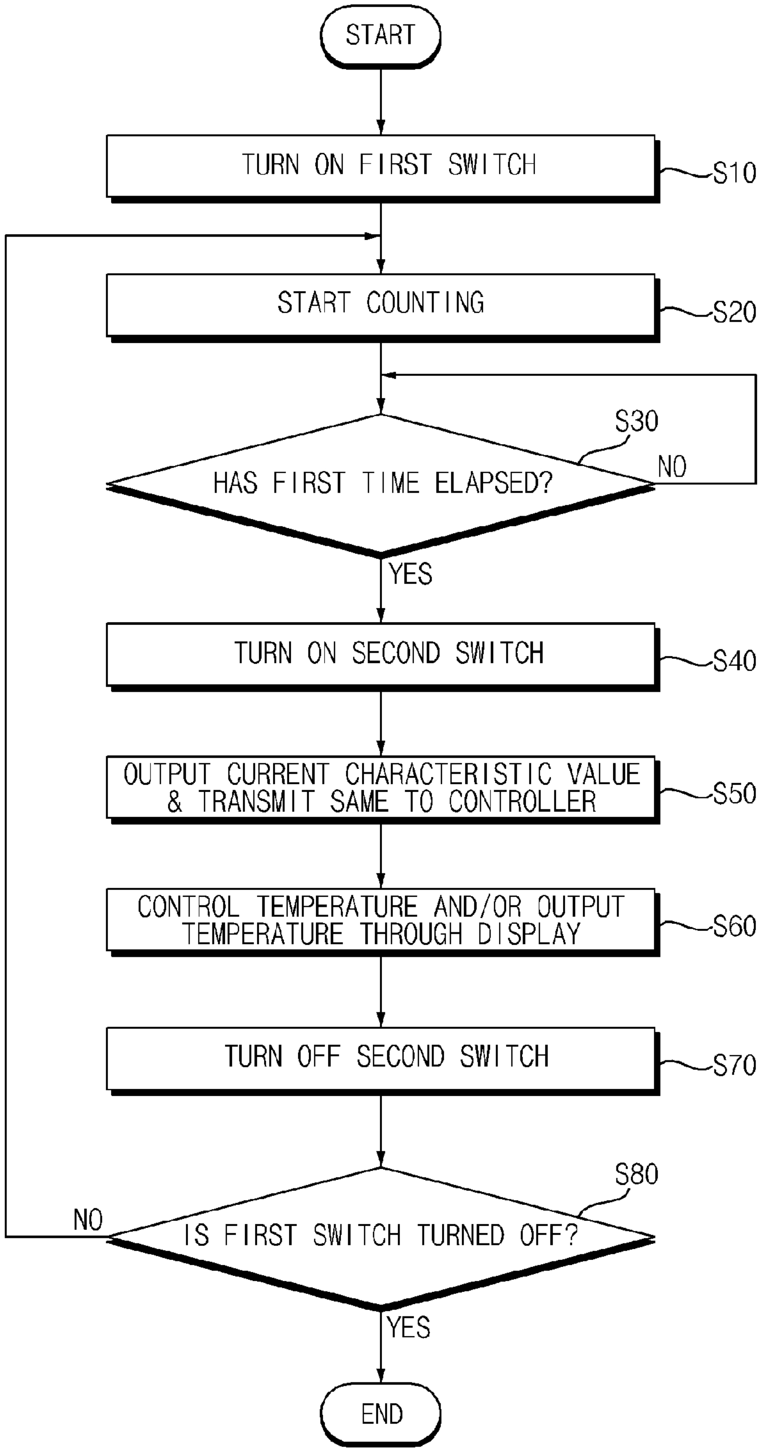

AEROSOL GENERATING DEVICE WHICH ACCURATELY SENSES HEATER TEMPERATURE

CROSS-REFERENCE TO RELATED APPLICATIONS

This application is the National Stage filing under 35 U.S.C. 371 of International Application No. PCT/KR2022/002902, filed on Mar. 2, 2022, which claims the benefit of earlier filing date and right of priority to Korean Application No. 10-2021-0027582, filed on Mar. 2, 2021, the contents of which are all hereby incorporated by reference herein their entirety.

TECHNICAL FIELD

The present disclosure relates to an aerosol-generating device.

BACKGROUND ART

An aerosol-generating device is a device that extracts certain components from a medium or a substance by forming an aerosol. The medium may contain a multicomponent substance. The substance contained in the medium may be a multicomponent flavoring substance. For example, the substance contained in the medium may include a nicotine component, an herbal component, and/or a coffee component. Recently, various research on aerosol-generating devices has been conducted.

DISCLOSURE OF INVENTION

Technical Problem

It is an object of the present disclosure to solve the above and other problems.

It is another object of the present disclosure to provide an aerosol-generating device designed such that variation in the resistance of a heater depending on changes in the temperature thereof is relatively small.

It is still another object of the present disclosure to maintain the amount of heat that is generated by the heater and to restrict a reduction in the amount of aerosol that is generated during use of the aerosol-generating device.

It is still another object of the present disclosure to more accurately sense the temperature of the heater.

Solution to Problem

In accordance with an aspect of the present disclosure for accomplishing the above and other objects, there is provided an aerosol-generating device including a cartridge, which includes a chamber configure to store a liquid, a wick for receiving the liquid from the chamber, and a heater for heating the wick, a case, to which the cartridge is detachably coupled and which has an insertion space formed to accommodate insertion of a stick therein, a first circuit including the heater, and a second circuit for sensing the temperature of the heater. The second circuit includes a first resistor, which is disposed to be in contact with or adjacent to the heater to receive heat from the heater, wherein a resistance value of is variable based on changes in the temperature thereof, a second resistor connected to the first resistor, and a sensor for acquiring the value of current applied to the second resistor.

Advantageous Effects of Invention

According to at least one of embodiments of the present disclosure, it is possible to design an aerosol-generating device in which variation in the resistance of a heater depending on changes in the temperature thereof is relatively small.

According to at least one of embodiments of the present disclosure, it is possible to maintain the amount of heat that is generated by the heater and to restrict a reduction in the amount of aerosol that is generated during use of the aerosol-generating device.

According to at least one of embodiments of the present disclosure, it is possible to more accurately sense the temperature of the heater.

Additional applications of the present disclosure will become apparent from the following detailed description. However, because various changes and modifications will be clearly understood by those skilled in the art within the spirit and scope of the present disclosure, it should be understood that the detailed description and specific embodiments, such as preferred embodiments of the present disclosure, are merely given by way of example.

BRIEF DESCRIPTION OF DRAWINGS

The above and other objects, features, and other advantages of the present disclosure will be more clearly understood from the following detailed description taken in conjunction with the accompanying drawings, in which:

FIGS. 1 to 12 are views showing examples of an aerosol-generating device according to embodiments of the present disclosure.

BEST MODE FOR CARRYING OUT THE INVENTION

Hereinafter, the embodiments disclosed in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In addition, in the following description of the embodiments disclosed in the present specification, a detailed description of known functions and configurations incorporated herein will be omitted when the same may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents, and substitutions within the scope and sprit of the present disclosure.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present. On the other hand, when a component is referred to as being "directly connected to" or "directly coupled to" another component, there are no intervening components present.

As used herein, the singular form is intended to include the plural forms as well, unless the context clearly indicates otherwise.

Referring to FIGS. 1 and 2, an aerosol-generating device 100 may include at least one of a battery 10, a controller 20, a heater 30, a cartridge 40, or a sensor 51. At least one of the battery 10, the controller 20, the heater 30, the cartridge 40, or the sensor 51 may be disposed inside a case 110 of the aerosol-generating device 100.

The case 110 may be provided with an insertion space, into which a stick 200 is inserted. The insertion space, into which the stick 200 is inserted, may be formed in the vicinity of the heater 30.

Referring to FIG. 1, the battery 10, the controller 20, the sensor 51, the cartridge 40, and the heater 30 may be arranged in a row. Referring to FIG. 2, the cartridge 40 and the heater 30 may be disposed parallel to each other so as to face each other. The internal structure of the aerosol-generating device 100 is not limited to that illustrated in the drawings.

The battery 10 may supply power so that at least one of the controller 20, the heater 30, the cartridge 40, or the sensor 51 operates. The battery 10 may supply power required to operate a display, a motor, etc. mounted in the aerosol-generating device 100.

The controller 20 may control the overall operation of the aerosol-generating device 100. The controller 20 may control the operation of at least one of the battery 10, the heater 30, the cartridge 40, or the sensor 51. The controller 20 may control the operation of the display, the motor, etc. mounted in the aerosol-generating device 100. The controller 20 may determine whether the aerosol-generating device 100 is in an operable state by checking the state of each of the components of the aerosol-generating device 100.

The heater 30 may generate heat using power supplied from the battery 10. The heater 30 may heat the stick 200 inserted into the aerosol-generating device 100. The heater 30 may be referred to as a first heater 30.

The cartridge 40 may generate an aerosol. The aerosol generated by the cartridge may be delivered to a user through the stick 200 inserted into the aerosol-generating device 100. The cartridge 40 may be detachably coupled to the case 110.

The sensor 51 may sense the temperature of a heater 45 (refer to FIG. 5), which is disposed inside the cartridge 40. The heater 45 may be referred to as a second heater 45 or a heater 45. The sensor 51 may be disposed so as to be removable from the cartridge 40.

The controller 20 may control the temperature of the heater 45 based on the temperature of the heater 45 sensed by the sensor 51. The controller 20 may provide information about the temperature of the heater 45 to the user through a user interface based on the temperature of the heater 45 sensed by the sensor 51.

Referring to FIG. 3, the controller 20 may be electrically connected to various components. The controller 20 may control the components connected thereto.

The controller 20 may be electrically connected to an input interface 53. The user may input various commands, such as turning on or turning off of the power supply and activation or deactivation of the heater, to the input interface 53. The controller 20 may receive a command from the input interface 53 to control the operation of the components.

The controller 20 may be electrically connected to an output interface 54. The output interface 54 may provide the user with various pieces of information, such as information about on/off operation of the power supply, information about whether the heater is operating, information about the stick, information about the liquid, and information about the state of charge of the battery. The controller 20 may control the output interface 54 to provide information to the user based on various pieces of information received from the components.

The output interface 54 may include a display. The display may display information to the outside to provide the same to the user.

The output interface 54 may include a haptic output interface. The haptic output interface may provide information to the user through vibration. The haptic output interface may include a vibration motor.

The output interface 54 may include a sound output interface. The sound output interface may output a sound corresponding to information to provide the information to the user. The sound output interface may include a speaker.

The controller 20 may be electrically connected to a memory 55. The memory 55 may store therein data on information. The memory 55 may receive data on various pieces of information from the controller 20 to store the same, or may transmit stored data to the controller 20. The controller 20 may control the operation of the components based on data received from the memory 55.

The controller 20 may be connected to a first switch 455 to control the operation of the first switch 455. The controller 20 may be connected to a second switch 465 to control the operation of the second switch 465.

Referring to FIG. 4, the cartridge 40 may be detachably coupled to the case 110.

The case 110 may include a lower case **110*a* and an upper case 110*b*. The lower case 110*a* may accommodate at least one of the battery 10, the controller 20, or the sensor 51 (refer to FIG. 2). The upper case 110*b* may be disposed on the lower case 110*a***.

The upper case **110*b* may include an insertion space 112, into which the stick 200 is inserted. The upper end of the upper case 110*b* may be open, and the insertion space 112 may extend downwards from the open upper end of the upper case 110*b*. The upper case 110*b* may accommodate the first heater 30 (refer to FIG. 2). The first heater 30 may be disposed around the insertion space 112**.

The upper case **110*b* may include a space in which the cartridge 40 is detachably mounted. The lower portion of the cartridge 40 may be in contact with and supported by a support surface 118 formed in the upper case 110*b*. Connection portions 453 and 463 may be disposed in the vicinity of the support surface 118. The cartridge 40 may be in contact with the connection portions 453 and 463 to be electrically connected to other components located inside the aerosol-generating device 100**.

A second inlet 116 may be formed in the upper case **110*b*. The second inlet 116 may be connected to a first outlet 407 (refer to FIG. 6) formed in the cartridge 40. A third flow passage 114 may be disposed between the second inlet 116 and the insertion space 112. The third flow passage 114 may connect the second inlet 116 to the insertion space 112**.

Accordingly, the aerosol generated in the cartridge 40 may be introduced into the second inlet 116, and may flow toward the insertion space 112.

A cap 120 may be detachably coupled to the outer side of the upper case 110*b*. The cap 120 may surround the upper case 110*b* and the cartridge 40 coupled to the upper case 110*b*.

The cap 120 may have a second outlet 121 formed in the upper portion thereof. When the cap 120 is coupled to the upper case 110*b*, the second outlet 121 may communicate with the insertion space 112. The cap 120 may include a cover 122, which opens or closes the second outlet 121. A slit 123 may be formed in the upper portion of the cap 120 so as to be connected to the second outlet 121. The cover 122 may be mounted on the upper portion of the cap 120 so as to be movable along the slit 123.

Referring to FIG. 5, the cartridge 40 may include a container 41, in which a liquid is stored, and a base 42, in which an aerosol is generated. The container 41 and the base 42 may be coupled to each other in the upward-downward direction. The container 41 may be disposed on the base 42. The liquid stored in the container 41 may be supplied to the base 42.

The container 41 may include a first inlet 401, into which external air is introduced. The external air introduced into the first inlet 401 may pass through the base 42.

Referring to FIG. 6, the container 41 may include a first chamber C1 for storing a liquid therein. The first chamber C1 may be surrounded by the outer walls 411 and 412 of the container 41. The sidewall 411 of the container 41 may be connected to the upper wall 412 of the container 41 to form the periphery of the container 41. The sidewall 411 of the container 41 may surround the side surface of the first chamber C1. The upper wall 412 of the container 41 may cover the upper portion of the first chamber C1. The sidewall 411 and the upper wall 412 of the container 41 may form the outer wall of the container 41. The lower portion of the container 41 may be open toward the second chamber C2.

The container 41 may include a first inlet 401, into which external air is introduced. The outer wall of the container 41 may be open to form the first inlet 401. The first inlet 401 may be formed in the upper portion of the container 41.

The container 41 may include a first flow passage 403, which communicates with the first inlet 401 and extends downwards. The first flow passage 403 may be elongated downwards from the first inlet 401 along the first chamber C1.

The first flow passage 403 may be surrounded by passage walls 413 and 414. The passage walls 413 and 414 may be elongated in the upward-downward direction. The passage walls 413 and 414 may include an inner passage wall 413 and an outer passage wall 414.

The inner passage wall 413 may be disposed inside the container 41. The inner passage wall 413 may be connected to the sidewall 411 and the upper wall 412 of the container 41. The inner passage wall 413 may extend downwards from the upper wall 412 of the container 41 along the first chamber C1 and the first flow passage 403. The inner passage wall 413 may be disposed between the first chamber C1 and the first flow passage 403. The first chamber C1 and the first flow passage 403 may be isolated from each other by the inner passage wall 413. The first chamber C1 may be surrounded by the sidewall 411, the upper wall 412, and the inner passage wall 413 of the container 41. The inner passage wall 413 may have a "["-shaped cross-section.

The outer passage wall 414 may form the outer wall of the container 41. The outer passage wall 414 may be contiguous with the first inlet 401. The outer passage wall 414 may extend in the upward-downward direction along the first flow passage 403. The outer passage wall 414 may be connected to the inner passage wall 413 and the sidewall 411 of the container 41.

The base 42 may be disposed beneath the container 41. The base 42 may have a second chamber C2 formed therein to communicate with the first flow passage 403. The second chamber C2 may be surrounded by the outer walls 421 and 422 of the base 42. The sidewall 421 of the base 42 may be connected to the lower wall 422 of the base 42 to form the periphery of the base 42. The sidewall 421 of the base 42 may surround the side surface of the second chamber C2. The lower wall 422 of the base 42 may cover the lower portion of the second chamber C2. The upper portion of the base 42 may be open toward the first chamber C1.

The base 42 may have formed therein a second flow passage 405. The second flow passage 405 may be connected to the first flow passage 405. The second flow passage 405 may be connected to the second chamber C2. The second flow passage 405 may be located between the first flow passage 403 and the second chamber C2. The second flow passage 405 may connect the first flow passage 403 and the second chamber C2 to each other.

The base 42 may include a first outlet 407, which communicates with the second chamber C2 and from which air is discharged. The sidewall 421 of the base 42 may be open to form the first outlet 407. The first outlet 407 may be connected to the second inlet 116 formed in the upper case 110*b* (refer to FIG. 4). The aerosol generated in the second chamber C2 may be discharged through the first outlet 407, and may then be delivered to the stick 200 inserted into the aerosol-generating device 100 (refer to FIG. 4).

A wick 44 may be disposed in the second chamber C2. The wick 44 may receive the liquid from the first chamber C1.

The heater 45 may be disposed in the second chamber C2. The heater 45 may heat the wick 44. The heater 45 may be wound around the wick 44 multiple times. The heater 45 may heat the wick 44, which receives the liquid, to generate an aerosol. The heater 30 disposed in the case 110 (refer to FIGS. 1 and 2) may be referred to as a first heater 30, and the heater 45 disposed in the second chamber C2 may be referred to as a second heater 45.

A plate 43 may be fixedly disposed between the first container 41 and the base 42. The plate 43 may be disposed between the first chamber C1 and the second chamber C2. The plate 43 may have a flat shape. The plate 43 may partition the inner space in the cartridge 40 into the first chamber C1 and the second chamber C2 such that the first chamber C1 and the second chamber C2 are isolated from each other.

The plate 43 may have formed therein a liquid supply hole 431 (refer to FIG. 7), through which the first chamber C1 and the second chamber C2 communicate with each other. The wick 44 may receive the liquid from the first chamber C1 through the liquid supply hole 431 (refer to FIG. 7).

Referring to FIGS. 7 and 8, a support body 423 may be surrounded by the sidewall 421 and the lower wall 422 of the base 42. The support body 423 may be disposed inside the base 42 to fix at least one of the wick 44 or the heater 45.

The wick 44 may extend in one direction. The wick 44 may be elongated in a direction intersecting the upward-downward direction. The wick 44 may be fixed by the support body 423 and the lower portion of the plate 43.

The heater 45 may be wound around the wick 44 multiple times in the longitudinal direction of the wick 44. The heater 45 may have the shape of a coil that surrounds the wick 44.

The two opposite ends 451 of the heater 45, which is wound around the wick 44 multiple times, may extend toward the support body 423. The two opposite ends 451 of the heater 45 may be fixed to the support body 423. The two opposite ends 451 of the heater 45 may penetrate the support body 423, and may be exposed to the outside of the support body 423.

First terminals 452 may be disposed in the lower wall 422 of the base 42. The two opposite ends 451 of the heater 45 may penetrate the support body 423, and may be in contact with the first terminals 452. The first terminals 452 may be exposed to the outside from the lower wall 422 of the base 42. When the cartridge 40 is coupled to the upper case 110*b*, the first terminals 452 may come into contact with the first connection portions 453 formed in the upper case 110*b*.

The support body 423 may include a third chamber C3, which is open upwards. The third chamber C3 may be formed to be open toward the heater 45. The heater 45 may be disposed above the third chamber C3.

The support body 423 may fix a first resistor 46. The first resistor 46 may be exposed toward the heater 45 through the third chamber C3. The first resistor 46 may be disposed so as to face away from the third chamber C3 toward the second chamber C2. The first resistor 46 may be in contact with the heater 45, or may be disposed adjacent to the heater 45.

Connection lines 461, which are connected to the two opposite ends of the first resistor 46, may be fixed to the support body 423. The connection lines 461 may protrude from the support body 423 toward the third chamber C3. The connection lines 461 may penetrate the support body 423, and may be exposed to the outside.

Second terminals 462 may be disposed in the lower wall of the base 42. The connection lines 461 may penetrate the support body 423, and may be in contact with the second terminals 462. The second terminals 462 may be exposed from the lower wall 422 of the base 42 to the outside. When the cartridge 40 is coupled to the upper case 110*b*, the second terminals 462 may come into contact with the second connection portions 463 formed in the upper case 110*b*.

The first resistor 46 may be disposed between the two opposite ends 451 of the heater 45. The first resistor 46 may be in contact with or adjacent to the wound portion of the heater 45.

Accordingly, the heater 45 may receive power from a first power supply 454 (refer to FIG. 10) to generate heat.

Accordingly, a second power supply 464 (refer to FIG. 10) may supply power so that current flows through the second resistor 46.

Accordingly, the first resistor 46 may receive heat from the heater 45, and the temperature of the first resistor 46 may be equal to or substantially similar to the temperature of the heater 45.

Referring to FIGS. 9 and 10, the aerosol-generating device 100 may include a first circuit 45C, which includes the first power supply 454. The first circuit 45C may include the heater 45. The heater 45 may receive power from the first power supply 454 to generate heat.

A second circuit 46C may include a second power supply 464, the first resistor 46, and a second resistor 47. Current may flow through the first resistor 46 and the second resistor 47 due to the second power supply 464. The first circuit 45C and the second circuit 46C may be electrically isolated from each other.

The first resistor 46 may be in contact with or adjacent to the heater 45 to receive heat generated from the heater 45. The first resistor 46 may be a variable resistor, the resistance of which changes depending on changes in the temperature thereof. The temperature of the first resistor 46 may be equal to or substantially similar to the temperature of the heater 45.

The second resistor 47 may be connected to the first resistor 46. The second resistor 47 may be connected in series to the first resistor 46. The second resistor 47 may have a very low resistance. For example, the resistance value of the second resistor 47 may be 0.01 ohm to 0.001 ohm. The second resistor 47 may be referred to as a shunt resistor.

As the temperature of the heater 45 increases, the temperature of the first resistor 46 may increase. As the temperature of the first resistor 46 increases, the resistance value of the first resistor 46 may increase. When the resistance value of the first resistor 46 increases, the value of current that is applied to the second resistor 47 may change.

The second circuit 46C may include a sensor 51. The sensor 51 may be connected to the second resistor 47 to acquire the value of current that is applied to the second resistor 47. The sensor 51 may be connected to the controller 20 to output and transmit the current value to the controller 20. The controller 20 may estimate the temperature of the heater 45 based on the current value acquired by the sensor 51. The controller 20 may control the operation of the components of the aerosol-generating device 100 based on the current value acquired by the sensor 51.

The first circuit 45C may include a first switch 455. The first switch 455 may adjust the amount of power that is supplied to the heater 45 to thereby adjust the generation of heat. The controller 20 may be connected to the first switch 455. The controller 20 may control the first switch 455 to adjust the amount of heat that is generated by the heater 45. The first switch 455 may adjust the amount of current flowing through the first circuit 45C. For example, the first switch 455 may include a transistor. The transistor may be implemented as a well-known transistor, such as FET, BJT, JFET, MOSFET, TFT, UJT, IGBT, or MESFET.

The second circuit 46C may include a second switch 465, which opens or closes the second circuit 46C. The second switch 465 may be turned on or off to allow or interrupt the flow of current through the second circuit 46C. The controller 20 may be connected to the second switch 465. The controller 20 may control the on/off operation of the second switch 465. The controller 20 may control the second switch 465 to interrupt the supply of current from the second power supply 464. The controller 20 may control the second switch 465 so that the second power supply 464 supplies current to the first resistor 46 and the second resistor 47.

The heater 45 may be disposed inside the cartridge 40. The first resistor 46 may be disposed inside the cartridge 40. The second resistor 47 and the sensor 51 may be disposed inside the case 110.

When the cartridge 40 is separated from the case 110, the first resistor 46 may be separated from the second resistor 47. When the cartridge 40 is coupled to the case 110, the first resistor 46 and the second resistor 47 may be connected to each other.

As the temperature of the first resistor 46 increases, the resistance value of the first resistor 46 may increase. Because the first resistor 45 receives heat from the heater 45, the resistance value of the first resistor 46 may increase as the temperature of the heater 45 increases.

Meanwhile, the amount of power that is consumed by the heater 45 may be proportional to the amount of aerosol that is generated by the heater 45. The amount of power that is consumed by the heater 45 may be expressed using the equation below.

$$W=V_1^2/R_h$$

W: Amount of power that is consumed by the heater 45

$V_1$: Magnitude of voltage that is supplied from the first power supply 454

$R_h$: Resistance value of the heater 45 at temperature T

The resistance value of the heater 45 may be expressed using the equation below.

$$R_h=R_{h,ref}[1+\alpha_h(T-T_{ref})]$$

$R_h$: Resistance value of the heater 45 at temperature T $R_{h,ref}$: Resistance value of the heater 45 at temperature $T_{ref}$ $\alpha_h$: Temperature coefficient of resistance (TCR) of the heater 45

The resistance value of the first resistor 46 may be expressed using the equation below.

$$R_1=R_{1,ref}[1+\alpha_1(T-T_{ref})]$$

$R_1$: Resistance value of the first resistor 46 at temperature T $R_{1,ref}$: Resistance value of the first resistor 46 at temperature $T_{ref}$ $\alpha_1$: TCR of the first resistor 46

In the above equations, an may be less than $\alpha_1$ ($\alpha_h<\alpha_1$).

The TCR of the heater 45 may be lower than the TCR of the first resistor 46. The TCR of the first resistor 46 may be higher than the TCR of the heater 45. The TCR of the first resistor 46 may be greater than zero. The TCR of the heater 45 may be closer to zero than the TCR of the first resistor 46.

For example, the TCR of the heater 45 may be 400 ppm/° C. or less. For example, the heater 45 may be made of KANTHAL®. For example, the heater 45 may be made of nichrome. The material of the heater 45 may not be limited to any of the aforementioned metals.

For example, the TCR of the first resistor 46 may be 3850 ppm/° C. or greater. For example, the first resistor 46 may be made of copper. For example, the first resistor 46 may be made of titanium. The material of the first resistor 46 may not be limited to any of the aforementioned metals.

The total resistance value of the second circuit 46C may converge on the resistance value of the first resistor 46 as the temperature of the first resistor 46 increases. The resistance value of the first resistor 46 may be larger than the resistance value of the second resistor 47.

Accordingly, variation in the resistance value of the heater 45 depending on changes in the temperature thereof may be very small, or may be substantially zero. Accordingly, variation in the resistance value of the first resistor 46 depending on changes in the temperature thereof may be larger than variation in the resistance value of the heater 45 depending on changes in the temperature thereof.

Accordingly, it is possible to restrict a reduction in the amount of power that is consumed by the heater 45 or the amount of heat that is generated by the heater 45 during use of the aerosol-generating device 100. Accordingly, it is possible to restrict a reduction in the amount of aerosol that is generated during use of the aerosol-generating device 100.

Accordingly, variation in the resistance of the first resistor 46 depending on changes in the temperature thereof may be large. Variation in the resistance of the first resistor 46 depending on changes in the temperature thereof may be larger than variation in the resistance of the heater 45 depending on changes in the temperature thereof.

Accordingly, since the extent to which the value of current flowing through the second resistor 47 changes becomes large, it is possible to more accurately estimate the temperature of the heater 45 based on the current value acquired by the sensor 51.

Referring to FIG. 11, the second switch 465 may be turned on or off as necessary under the control of the controller 20, rather than being maintained in an always-on state.

In the state in which the second switch 465 is turned off (S1), the controller 20 may turn on the second switch 465 based on user input (S2). When the second switch 20 is turned on (S3), the sensor 51 may acquire the value of current flowing through the second resistor 47 to transmit the value of current to the controller 20 (S4).

The controller 20 may estimate the temperature of the heater 45 based on the current value acquired by the sensor 51. The controller 20 may control the temperature of the heater 45 based on the current value acquired by the sensor 51 (S5). The controller 20 may control the operation of the first switch 455 to control the temperature of the heater 45 (S5). The controller 20 may transmit the temperature of the heater 45 to the user through the output interface 54 based on the current value acquired by the sensor 51 (S5). Thereafter, the controller 20 may turn off the second switch 465 (S1).

Referring to FIG. 12, when the first switch 455 is turned on (S10), the controller 20 may count the time (S20). When the heater 45 starts to generate heat (S10), the controller may count the time (S20). When a first time elapses after start of counting (Yes in S30), the controller 20 may turn on the second switch 465 (S40). Thereafter, the sensor 51 may acquire the value of current flowing through the second resistor 47 to transmit the value of current to the controller 20 (S50). If the first time has not elapsed since start of counting (No in S30), the controller 20 may count the time until the first time elapses.

The controller 20 may estimate the temperature of the heater 45 based on the current value acquired by the sensor 51. The controller 20 may control the temperature of the heater 45 based on the current value acquired by the sensor 51 (S60). The controller 20 may control the operation of the first switch 455 to control the temperature of the heater 45 (S60). The controller 20 may transmit the temperature of the heater 45 to the user through the output interface 54 based on the current value acquired by the sensor 51 (S60).

Thereafter, the controller 20 may turn off the second switch 465 (S70). If the first switch 455 is not turned off (No in S80), the controller 20 may recount the time from the beginning and may repeat the above process (S20). When the first switch 455 is turned off (Yes in S80), control may be terminated.

Accordingly, it is possible to prevent power loss by performing control such that the second power supply 464 of the second circuit 46C does not always supply voltage.

Referring to FIGS. 1 to 12, an aerosol-generating device 100 in accordance with one aspect of the present disclosure may include a cartridge 40, which includes a chamber C1 configure to store a liquid, a wick 44 for receiving the liquid from the chamber C1, and a heater 45 for heating the wick 44, a case 110, to which the cartridge 40 is detachably coupled and which has an insertion space 112 formed to accommodate insertion of a stick 200 therein, a first circuit 45C including the heater 45, and a second circuit 46C for sensing the temperature of the heater 45. The second circuit 46C may include a first resistor 46, which is disposed to be in contact with or adjacent to the heater 45 to receive heat from the heater 45, wherein a resistance value of the first resistor is variable based on changes in the temperature thereof, a second resistor 47 connected to the first resistor 46, and a sensor 51 for acquiring the value of current applied to the second resistor 47.

In addition, in accordance with another aspect of the present disclosure, the first circuit 45C and the second circuit 46C may be electrically isolated from each other.

In addition, in accordance with another aspect of the present disclosure, the first resistor 46 may be disposed inside the cartridge 40, and the second resistor 46 and the sensor 51 may be disposed inside the case 110.

In addition, in accordance with another aspect of the present disclosure, the first resistor 46 may be separated from the second resistor 47 when the cartridge 40 is separated from the case 110, and the first resistor 46 and the second resistor 47 may be connected to each other when the cartridge 40 is coupled to the case 110.

In addition, in accordance with another aspect of the present disclosure, the wick 44 may extend in a first longitudinal direction. The heater 45 may be wound around the wick 44 multiple times along the first longitudinal direction of the wick 44 and may have two opposite ends 451 extending from the wick 44 in a second direction intersecting the first longitudinal direction of the wick 44. The first resistor 46 may be disposed between the two opposite ends 451 of the heater 45, and may be disposed so as to be in contact with or adjacent to the wound portion of the heater 45.

In addition, in accordance with another aspect of the present disclosure, the heater may have a temperature coefficient of resistance (TCR) lower than the TCR of the first resistor 46.

In addition, in accordance with another aspect of the present disclosure, the TCR of the heater 45 may be 400 ppm/° C. or less.

In addition, in accordance with another aspect of the present disclosure, the TCR of the first resistor 46 may be 3850 ppm/° C. or greater.

In addition, in accordance with another aspect of the present disclosure, the resistance value of the first resistor increases as the temperature of the heater 45 increases.

In addition, in accordance with another aspect of the present disclosure, the second circuit 46C may include a second switch 465 configured to open or close the second circuit 46C. The aerosol-generating device may further include a controller 20 configured to control the operation of the second switch 465.

In addition, in accordance with another aspect of the present disclosure wherein, the controller is configured to close the second switch to turn on the second circuit when a first time elapses after a start time of generation of heat by the heater 45.

In addition, in accordance with another aspect of the present disclosure, the controller 20 is configured to control the temperature of the heater 45 based on the current value applied to the second resistor as acquired by the sensor 51.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An aerosol-generating device comprising:
- a cartridge comprising a chamber configured to store a liquid, a wick configured to receive the liquid from the chamber, and a heater configured to heat the wick;
- a case configured to allow the cartridge to be detachably coupled thereto, the case having an insertion space formed to accommodate insertion of a stick therein;
- a first circuit including the heater; and
- a second circuit electrically isolated from the first circuit and configured to sense a temperature of the heater,
- wherein the second circuit comprises:
- a first resistor disposed to be in contact with or adjacent to the heater to receive heat from the heater, wherein a resistance value of the first resistor is variable based on changes in temperature thereof;
- a second resistor connected to the first resistor; and
- a sensor configured to acquire a value of current applied to the second resistor,
- wherein the first resistor is disposed inside the cartridge, and the second resistor and the sensor are disposed inside the case, and
- wherein the first resistor is separated from the second resistor when the cartridge is separated from the case, and the first resistor and the second resistor are connected to each other when the cartridge is coupled to the case.

2. The aerosol-generating device according to claim 1, wherein:
- the wick extends in a first longitudinal direction,
- the heater is wound around the wick multiple times along the first longitudinal direction of the wick and has two opposite ends extending from the wick in a second direction intersecting the first longitudinal direction of the wick, and
- the first resistor is disposed between the two opposite ends of the heater and is disposed so as to be in contact with or adjacent to a wound portion of the heater.

3. The aerosol-generating device according to claim 1, wherein the heater has a temperature coefficient of resistance (TCR) lower than a TCR of the first resistor.

4. The aerosol-generating device according to claim 3, wherein the TCR of the heater is 400 ppm/° C. or less.

5. The aerosol-generating device according to claim 3, wherein the TCR of the first resistor is 3850 ppm/° C. or greater.

6. The aerosol-generating device according to claim 1, wherein the resistance value of the first resistor increases as the temperature of the heater increases.

7. The aerosol-generating device according to claim 1, wherein the second circuit includes a second switch configured to open or close the second circuit, and wherein the aerosol-generating device further comprises a controller configured to control operation of the second switch.

8. The aerosol-generating device according to claim 7, wherein the controller is configured to close the second switch to turn on the second circuit when a first time elapses after a start time of generation of heat by the heater.

9. The aerosol-generating device according to claim 8, wherein the controller is configured to control the temperature of the heater based on the value of current applied to the second resistor as acquired by the sensor.

10. The aerosol-generating device according to claim 1, wherein:

the first circuit comprises a first power supply and the heater receives power from the first power supply; and the second circuit comprises a second power supply and current flows through the first resistor and the second resistor due to the second power supply.

11. The aerosol generating device according to claim 1, wherein the chamber comprises:

a first chamber configured to store the liquid, and a second chamber isolated from the first chamber, wherein the wick and the heater are disposed in the second chamber, wherein the wick is configured to receive the liquid from the first chamber.

12. The aerosol generating device according to claim 11, further comprising a plate disposed between the first chamber and the second chamber such that the first chamber is isolated from the second chamber.

13. The aerosol generating device according to claim 11, wherein:

the plate further comprises a liquid supply hole through which the first chamber and the second chamber communicate; and the wick receives the liquid from the first chamber through the liquid supply hole.

* * * * *